United States Patent

Baschang et al.

[11] 3,914,212
[45] Oct. 21, 1975

[54] ANHYDROFURANOSE DERIVATIVES AND PROCESSES FOR THEIR MANUFACTURE

[75] Inventors: Gerhard Baschang, Bettingen; Jaroslav Stanek, Birsfelden; Alberto Rossi, Oberwil; Alex Sele, Basel, all of Switzerland

[73] Assignee: Ciba-Geigy Corporation, Ardsley, N.Y.

[22] Filed: May 23, 1973

[21] Appl. No.: 363,287

[30] Foreign Application Priority Data

May 30, 1972 Switzerland.................... 7970/72
Sept. 26, 1972 Switzerland.................. 14046/72
Apr. 17, 1973 Switzerland.................... 5496/73

[52] U.S. Cl...... 260/209 R; 260/210 R; 260/211 R; 260/234 R; 424/180
[51] Int. Cl.² ............... C07H 15/06; C07H 15/18
[58] Field of Search ......... 260/209 R, 210 R, 211 R

[56] References Cited
UNITED STATES PATENTS

| | | | |
|---|---|---|---|
| 3,414,560 | 12/1968 | Carlberg et al. ................ | 260/209 R |
| 3,655,884 | 4/1972 | Rossi et al...................... | 260/209 R |

OTHER PUBLICATIONS

Heyns et al., "Chem. Ber." Vol. 105, pp. 2228–2232, 1972.

*Primary Examiner*—Johnnie R. Brown
*Attorney, Agent, or Firm*—Joseph G. Kolodny; Theodore O. Groeger; John J. Maitner

[57] ABSTRACT

New anhydrofuranose derivatives of the formula I

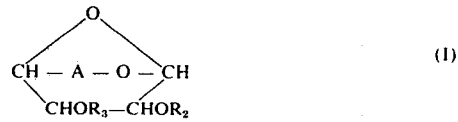

wherein $R_2$ is hydrogen, alkyl, aminoalkyl, alkenyl, arylalkyl, or acyl, $R_3$ is hydrogen, alkyl, alkenyl, arylalkyl or acyl and —A—O— is a —$CHR_5$—$CH_2$—O— or —$CH(CH_2OR_6)$—O— radical, wherein $R_5$ or $R_6$ has one of the meanings indicated for $R_3$, or wherein —$CH_2OR_6$ represents hydrogen, or wherein two of the radicals $R_2$, $R_3$ and $R_5$ or $R_6$ together represent an ylidene radical, and one of the radicals $R_2$, $R_3$ and $R_5$ or $R_6$ is different from hydrogen if the other two of these radicals are hydrogen, and in compounds with —$CHR_5$—$CH_2$—O— as the —A—O— radical, one of the radicals $R_2$, $R_3$ and $R_5$ is different from methyl if the other two of these radicals are methyl, and in compounds with —$CHR_5$—$CH_2$—O— as the —A—O— radical, one of the radicals $R_2$, $R_3$ and $R_5$ is different from acetyl if the other two of these radicals are acetyl, and in compounds with —$CHR_5$—$CH_2$—O— as the —A—O— radical one of the radicals $R_2$, $R_3$ and $R_5$ is different from p-toluenesulphonyl if the others of these radicals are p-toluenesulphonyl, and in compounds with —$CH(CH_2OR_6)$—O— as the —A—O— radical, one of the radicals $R_2$, $R_3$ and $R_6$ is different from benzyl if the other two of these radicals are benzyl, are manufactured by processes which are known per se. They are useful as anti-inflammatory, antiarthritic and analgesic agents.

14 Claims, No Drawings

NEW ANHYDROFURANOSE DERIVATIVES AND PROCESSES FOR THEIR MANUFACTURE

The invention relates to new anhydrofuranose derivatives of the formula I

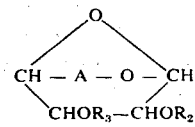

wherein $R_2$ is hydrogen, alkyl, aminoalkyl, alkenyl, arylalkyl or acyl, $R_3$ is hydrogen, alkyl, alkenyl, arylalkyl or acyl and —A—O— is a —CHOR$_5$—CH$_2$—O— or —CH(CH$_2$OR$_6$)—O— radical, wherein $R_5$ or $R_6$ has one of the meanings indicated for $R_3$, or wherein —CH$_2$OR$_6$ represents hydrogen, or wherein two of the radicals $R_2$, $R_3$ and $R_5$ or $R_6$ together represent an ylidene radical, and one of the radicals $R_2$, $R_3$ and $R_5$ or $R_6$ is different from hydrogen if the other two of these radicals are hydrogen, and in compounds with —CHOR$_5$—CH$_2$—O— as the —A—O—radical, one of the radicals $R_2$, $R_3$ and $R_5$ is different from methyl if the other two of these radicals are methyl, and in compounds with —CHOR$_5$—CH$_2$—O— as the —A—O— radical, one of the radicals $R_2$, $R_3$ and $R_5$ is different from acetyl if the other two of these radicals are acetyl, and in compounds with —CHOR$_5$—CH$_2$—O— as the —A—O— radical one of the radicals $R_2$, $R_3$ and $R_5$ is different from p-toluenesulphonyl if the others of these radicals are p-toluenesulphonyl, and in compounds with —CH(CH$_2$OR$_6$)—O— as the —A—O— radical, one of the radicals $R_2$, $R_3$ and $R_6$ is different from benzyl if the other two of these radicals are benzyl, and to processes for their manufacture.

Lower radials are, in the following text, especially those with up to 7 C atoms, above all with up to 4 C atoms. A radical of aliphatic character is a radical of which the free bond starts from an atom which is not a member of an aromatic system.

The new anhydrofuranose derivatives of the formula I are 1,5-anhydro-L- or -D-hexofuranose derivatives of 1,6-anhydro-L- or -D-hexofuranose derivatives, especially 1,6-anhydro-β-D-glucofuranose derivatives, 1,6-anhydro-β-D-allofuranose derivatives, 1,6-anhydro-β-D-mannofuranose derivatives and 1,6-anhydro-α-L-idofuranose derivatives, 1,6-anhydro-α-L-gluose derivatives or corresponding 1,5-anhydroxylofuranose derivatives.

Alkyl $R_2$, $R_3$ and/or $R_5$ or $R_6$ is, in particular, lower alkyl, for example ethyl, iso-propyl, or straight-chain or branched butyl, pentyl, hexyl or heptyl bonded in any desired position, and above all methyl or n-propyl.

Aminoalkyl $R_2$ is, in particular, amino-lower alkyl, wherein amino can be free amino, lower alkylamino or di-lower alkylamino, such as 2-methylamino-ethyl, 2-dimethyl-amino-ethyl, 2-ethylamino-ethyl and especially 2-diethyl-amino-ethyl.

Alkenyl $R_2$, $R_3$ and/or $R_5$ or $R_6$ is, in particular, lower alkenyl, for example isopropenyl, 2-methallyl, 3-butenyl and above all allyl.

Arylalkyl $R_2$, $R_3$ and/or $R_5$ or $R_6$ is, in particular, aryl-lower alkyl, wherein the lower alkyl part above all has the above meaning and is especially methyl, and wherein the aryl part is naphthyl or above all phenyl, which are optionally substituted, such as by halogen, lower alkyl, lower alkoxy, trifluoromethyl and/or hydroxyl, the aryl part carrying several, such as two or three, but especially only one, substituent, preferably in the 4-position, or being unsubstituted.

Halogen is, for example, bromine and especially chlorine.

Lower alkyl is, in particular, as indicated for $R_2$, $R_3$ and/or $R_5$ or $R_6$.

Lower alkoxy is in particular such that the lower alkyl part has the meaning indicated for $R_2$, $R_3$ and/or $R_5$ or $R_6$, such as ethoxy, n-propoxy, iso-propoxy or above all methoxy.

Acyl $R_2$, $R_3$ and/or $R_5$ or $R_6$ is especially an acyl radical of an organic acid, especially of an organic carboxylic acid. Thus, acyl is, in particular, alkanoyl, above all lower alkanoyl, such as acetyl or propionyl, or aroyl, such as naphthoyl-1, naphthoyl-2 and especially benzoyl, or benzoyl substituted by halogen, lower alkyl, lower alkoxy, trifluoromethyl, hydroxyl or lower alkanoyloxy, such as salicyloyl or acetylsalicyloyl, as well as pyridylcarbonyl, for example nicotinoyl, or alternatively an acyl radical of an organic sulphonic acid, for example of an alkanesulphonic acid, especially a lower alkanesulfphonic acid, such as methanesulphonic acid or ethanesulphonic acid, or of an arylsulphonic acid, especially of an optionally lower alkyl-substituted phenylsulphonic acid, such as benzenesulphonic acid or p-toluenesulphonic acid, as well as carbamoyl, such as unsubstituted carbamoyl, lower alkyl-carbamoyl or aryl-carbamoyl, such as methylcarbamoyl or phenylcarbamoyl.

Acyl $R_2$, $R_3$ and/or $R_5$ or $R_6$ is however also an acyl radical of a carboxylic acid having an anti-inflammatory action, especially an acyl radical of the formula II

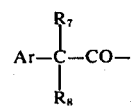

wherein Ar denotes a phenyl radical which can be substituted preferably by cycloalkyl, cycloalkenyl, aryl, aryl-lower alkyl, cycloalkyl-lower alkyl, lower alkoxy, lower alkenyloxy, lower alkylmercapto, phenoxy, phenylmercapto, halogen, trifluormethyl, nitrile, nitro, hydroxyl, mercapto, lower alkylamino, di-lower alkylamino, phenylamino, N-phenyl-N-lower alkylamino or lower alkyleneamino groups, wherein the lower alkylene radical can optionally be interrupted by oxygen atoms, sulphur atoms or nitrogen atoms which are optionally substituted by lower alkyl or lower alkanoyl groups, as well as lower alkenyleneamino, lower alkanoylamino, carbamoyl, N-lower alkylcarbamoyl, N,N-di-lower alkylcarbamoyl, sulphamoyl, N-lower alkylsulphamoyl, N,N-di-lower alkylsulphamoyl, lower alkylsulphonyl, lower alkylsulphinyl or benzoyl groups, as well as by 1,2,3,4-tetrahydroquinolinyl-(1), 1,2,3,4-tetrahydro-isoquinolinyl-(2), phenoxazinyl-(10), phenothiazinyl-(10), indolinyl-(1), 10,11-dihydro-5H-dibenz[b,f]-azepinyl-(5), Δ$^4$-oxazolinyl-(3), Δ$^4$-isoxazolinyl-(2) or Δ$^4$-thiazolinyl-(3), 2H-1,2-thiazinyl-(2), 3,4-, 3,6- or 5,6-dihydro-2H-1,2-thiazinyl-(2), 2,3-dihydro-4H-1,2-oxazinyl-(2), 3,4- or 3,6-dihydro-2H-1,3-oxazinyl-(3), 4H-1,4-oxazinyl-(4 ), 2,3-dihydro-4H-1,4-oxazinyl-(4), 2H-1,2-oxazinyl-(2) or 5,6-dihydro-2H-1,2-oxazinyl-(2), but preferably pyrrolyl- (1), isoindolinyl-(2) or 3,6-dihydro-2H-1,2-oxazinyl-(2) or 1-oxo-isoindolinyl-(2) radicals, and/or lower alkyl or lower alkenyl groups, it being possible for 2 adjacent lower alkyl groups together to form a lower alkylene or lower alkenylene group, and the phenyl radical in a substituent of Ar, preferably in an appropriately substituted amino group, being able to contain, for example, lower alkyl, lower alkoxy or trifluoromethyl radicals and/or halogen atoms as substituents, and $R_7$ and $R_8$ are identical or different and denote a hydrogen atom, a lower alkyl, lower alkenyl, lower alkinyl, lower alkylidene, lower alkenylidene or lower alkinylidene radical or a cycloalkyl, aryl-lower alkyl or aryl radical.

Cycloalkyl, cycloalkenyl and cycloalkyl-lower alkyl are, for example, monocyclic, bicyclic or polycyclic cycloalkyl, cycloalkenyl or cycloalkyl-lower alkyl, wherein a cycloalkyl part contains, for example, up to 12, such as 3–8, preferably 5–8, ring carbon atoms, whilst a cycloalkenyl radical possesses, for example, up to 12, such as 3–8, preferably 5–8, ring carbon atoms, and, if possible, 2 and especially 1 double bond.

An aryl radical is an aromatic hydrocarbon radical, for example a monocyclic, bicyclic or polycyclic armoatic hydrocarbon radical, especially a phenyl radical as well as a naphthyl radical, which can optionally be monosubstituted, disubstituted or polysubstituted, for example by nitro, lower alkyl, lower alkoxy, halogen and/or trifluoromethyl, or can also, together with a cycloaliphatic ring, form the radical of a condensed ring system, especially a 5-H-dibenzo[a,d]cycloheptenyl or a 10,11-dihydro-5-H-dibenzo[a,d]cycloheptenyl radical, Aryl-lower alkyl is, for example, a radical indicated for $R_2$, such as, in particular, benzyl and 2-phenylethyl.

Lower alkenyloxy contains, as the lower alkenyl part, especially one of the abovementioned lower alkenyl radicals, and is in particular allyloxy or methallyloxy.

Lower alkylmercapto contains, as the lower alkyl part, especially one of the abovementioned lower alkyl radicals, and is, in particular, methylmercapto or ethylmercapto.

Lower alkylamino and di-lower alkylamino contain, as lower alkyl parts, especially one of the abovementioned lower alkyl radicals and are, in particular, methylamino, dimethylamino, ethylamino, N-methyl-N-ethylamino, diethylamino, n-propylamino or di-n-propylamino.

N-Phenyl-N-lower alkylamino contains, as the lower alkyl part, especially one of the abovementioned lower alkyl radicals and is, in particular, N-phenyl-N-methylamino or N-phenyl-N-ethyl-amino.

Lower alkyleneamino, wherein the lower alkylene radical can optionally be interrupted by oxygen, sulphur or nitrogen which is optionally substituted by lower alkyl or lower alkanoyl, are especially those which possess up to 8 ring members and up to 10 C atoms, and wherein hetero-atoms which may be present are separated by at least 2 C atoms, such as pyrrolidino, piperidino, morpholino, thiomorpholino, 2,6-dimethyl-thiomorpholino, piperazino, N'-lower alkylpiperazino, for example N'-methyl-piperazino, N'-hydroxy-lower alkyl-piperazino, for example N'-(2-hydroxyethyl)-piperazino or N'-hydroxymethyl-piperazino or N'-lower alkanoyl-piperazino, for example N'-acetyl-piperazino.

Lower alkyleneamino has, for example, up to 8 ring members, especially 5 to 6 ring members, such as, for example, $\Delta^3$-pyrrolinyl.

Lower alkanoylamino is, in particular, lower alkanoylamino with up to 7 C atoms, above all with up to 4 C atoms, such as propionylamino or acetylamino.

N-Lower alkyl-carbamoyl and N,N-di-lower alkylcarbamoyl contain, as lower alkyl radicals, especially those mentioned for $R_2$ and are, for example, N-methyl-carbamoyl, N-ethyl-carbamoyl, N,N-dimethyl-carbamoyl or N,N-diethyl-carbamoyl.

N-Lower alkyl-sulphamoyl and N,N-di-lower alkylsulphamayl, lower alkylsulphonyl and lower alkylsulphinyl contain, as lower alkyl radicals, especially those mentioned for $R_2$ and are, for example, N-methyl-sulphamoyl, N-ethylsulphamoyl, N,N-dimethyl-sulphamoyl, N,N-diethyl-sulphamoyl, methylsulphonyl, ethylsulphonyl, methylsulphinyl or ethylsulphinyl.

Benzoyl is, for example, benzoyl which is substituted, preferably with only one substituent, by lower alkyl, especially lower alkyl indicated for $R_2$, above all methyl, lower alkoxy, especially lower alkoxy indicated above, above all methoxy, halogen, above all bromine or chlorine, and/or trifluoromethyl, and is, very particularly, unsubstituted benzoyl.

Lower alkyl as a substituent of the radical Ar is, in particular, lower alkyl indicated for $R_2$, above all methyl.

Lower alkenyl as a substituent of the radical Ar is in particular lower alkenyl indicated for $R_2$, above all vinyl, allyl or methallyl.

Lower alkylene is, in particular, lower alkylene with 2–6 chain C atoms, above all with 3 or 4 chain C atoms, such as propylene-1,3 or butylene-1,4.

Lower alkenylene is, in particular, lower alkenylene with 2–6 chain C atoms, above all with 3 or 4 chain C atoms, such as prop-1-enylene-1,3 or but-1-enylene-1,4.

Lower alkinyl $R_7$ or $R_8$ is, for example, ethinyl, propargyl or 2-butinyl and lower alkylidene $R_7$ or $R_8$ is, for example, methylidene, ethylidene, n-propylidene or iso-propylidene.

Lower alkenylidene $R_7$ or $R_8$ is, for example, vinylidene, allylidene or methallylidene.

Lower alkinylidene $R_7$ or $R_8$ is, for example 2-propinylidene.

Cycloalkyl $R_7$ or $R_8$ has, in particular, the meaning indicated for the cycloalkyl substituents of the radical Ar and is above all cyclopropyl, cyclobutyl, cyclopentyl or cyclohexyl.

Aryl-lower alkyl $R_7$ or $R_8$ has, in particular, the meaning indicated for $R_2$ and is above all benzyl or 2-phenylethyl.

Aryl $R_7$ or $R_8$ in particular has the meaning indicated for the aryl substituents of the radical Ar and is above all phenyl.

An ylidene radical which accounts for two of the radicals $R_2$, $R_3$ and $R_5$ or $R_6$ is, in particular, a lower ylidene radical, such as a lower alkylidene radical, for example methylidene, ethylidene or especially isopropylidene, or an aryl-lower alkylidene radical, such as phenyl-lower alkylidene, wherein the phenyl part is optionally substituted by lower alkyl, lower alkoxy, halogen and/or trifluoromethyl, such as, above all, benzylidene.

Preferably, anhydrofuranose derivatives in all the abovementioned and subsequently mentioned ranges of compounds are 1,6-anhydro-β-D-glucofuranose derivatives.

The new compounds possess valuable pharmacological properties.

Thus, the anhydrofuranose derivatives according to the invention in particular show fibrinolytic and thrombolytic effects, as can be shown in animal experiments, for example, on rats. The fibrinolytic and thrombolytic activity manifests itself, in an experiment corresponding to the publication by M. Rüegg, L. Riesterer and R. Jaques, Pharmacology 4, 242–254 (1970), in a shortening of the lysis time of euglobulin clots.

The new compounds having an acyl radical of a carboxylic acid which possesses anti-inflammatory activity as the radical $R_2$, $R_3$ and/or $R_5$ or $R_6$ furthermore show novel inflammation-inhibiting and anti-nociceptive (analgesic) effects at low toxicity. Thus, these new compounds shown pronounced anti-inflammatory effects in the adjuvant-arthritis test [based on the method described by Newbould, Brit. J. Pharmacol., volume 21, pages 127–136 (1936)] when administered to rats. Furthermore, a pronounced analgesic component can be dedected by means of the benzoquinone writhing syndrome test [based on the test method described by Siegmund et al., Proc. Soc. Exptl, Biol. Med., volume 95, pages 729–733 (1957)] on mice. These new compounds are therefore useful as compounds which have an anti-inflammatory (antiphlogistic), for example anti-exudative or vascular permeability-inhibiting, above all anti-arthritic and analgesic effect, especially for the treatment of inflammations of a rheumatic nature.

Compounds which are particularly suitable because of their inflammation-inhibiting effects are compounds Ia of the formula I, wherein —A—O— is a —CHOR$_5$—CH$_5$—O— or —CH(CH$_2$OR$_6$)—O— radical and at least one of the radicals $R_2$, $R_3$ and $R_5$ or $R_6$ is an acyl radical of a carboxylic acid having an anti-inflammatory effect and the others of the radicals $R_2$, $R_3$ and $R_5$ or $R_6$, independently of one another, are optionally hydrogen, lower alkyl, lower alkenyl or aryl-lower alkyl, or two of the other radicals $R_2$, $R_3$ and $R_5$ or $R_6$ are optionally lower alkylidene or aryl-lower alkylidene.

Amongst these compounds Ia, there should especially be singled out compounds Ib, wherein —A—O— is a —CHOR$_5$—CH$_2$—O— or —CH(CH$_2$OR$_6$)—O— radical and at least one of the radicals $R_2$, $R_3$ and $R_5$ or $R_6$ is an acyl radical of the formula III

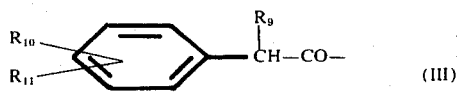

(III)

wherein $R_9$ denotes a hydrogen atom, a cycloalkyl radical or preferably a lower alkyl radical, $R_{10}$ denotes a hydrogen atom, a halogen atom or the trifluoromethyl group, $R_{11}$ above all denotes a phenyl radical, but especially a 5- to 8-membered cycloalkyl radical, preferably with a double bond, preferably in the Δ$^1$-position, in the ring, or in second place denotes a lower alkoxy, lower alkenyloxy or preferably branched lower alkyl radical as well as a mono- or di-lower alkylamino, lower alkyleneamino, lower alkenyleneamino, phenylamino or N-phenyl-N-lower alkylamino radical or a pyrrolyl-(1), 3,6-dihydro-2-H-1,2-oxazinyl-(2) or 1-oxoisoindolinyl-(2) radical, and the others of the radicals $R_2$, $R_3$ and $R_5$ or $R_6$ independently of one another optionally are hydrogen, lower alkyl, lower alkenyl, benzyl, lower alkylbenzyl, lower alkoxybenzyl, halogenobenzyl or trifluoromethylbenzyl or two of the other radicals $R_2$, $R_3$ and $R_5$ or $R_6$ are optionally lower alkylidene or benzylidene.

Preferably, in compounds Ib, —A—O— is a radical of the formula —CHOR$_5$—CH$_2$—O— and one of the radicals $R_2$, $R_3$ and $R_5$, preferably $R_2$, is an acyl radical of the formula III, wherein $R_9$ is lower alkyl, $R_{10}$ is hydrogen or chlorine, $R_{11}$ is phenyl, cyclopentyl, cyclohexyl, 1-cyclopentenyl, 1-cyclohexenyl, 1-cycloheptenyl, 1-cyclooctenyl, isopropyl, 1-methyl-n-propyl-1, or also Δ$^3$-pyrrolinyl and the other two of the radicals $R_2$, $R_3$ and $R_5$ independently of one another are hydrogen, lower alkyl with 1—3 C atoms, allyl, methallyl, benzyl, methyl-benzyl, methoxybenzyl, chlorobenzyl or trifluoromethylbenzyl.

Above all, however, in compounds Ib —A—O— is a radical of the formula —CHOR$_5$—CH$_2$—O— and $R_2$ is an acyl radical of the formula III, wherein $R_9$ is methyl, $R_{10}$ is hydrogen, $R_{11}$ is phenyl, cyclohexyl, 1-cyclohexenyl, 1-cycloheptenyl, 1-cyclooctenyl, or also Δ$^3$-pyrrolinyl and $R_3$ and $R_5$ independently of one another are hydrogen, lower alkyl with 1–3 C atoms, allyl, methallyl, benzyl or chlorobenzyl.

Compounds to be mentioned particularly are compounds Ib wherein —A—O— is a radical of the formula —CHOR$_5$—CH$_2$—O—, $R_2$ is an acyl radical of the formula III, wherein $R_9$ is methyl, $R_{10}$ is hydrogen, $R_{11}$ is phenyl, cyclohexyl, 1-cyclohexenyl, 1-cycloheptenyl, 1-cyclooctenyl or Δ$^3$-pyrrolinyl and $R_3$ and $R_5$ are hydrogen. Preferably, —A—O— is a —CHOR$_5$—CH—O— radical in all of the ranges of compounds mentioned above.

1,6-Anhydro-3,5-di-0-benzyl-2-0-α-[4-(cyclohexen-1-yl)-phenyl]-propionyl-β-D-glucofuranose should be singled out particularly.

Compounds which are particularly suitable because of their fibrinolytic and thrombolytic effects are compounds Ic of the formula I, wherein —A—O— is a radical of the formula —CHOR$_5$—CH$_2$—O— and $R_2$, $R_3$ and $R_5$ independently of one another are lower alkyl with 2–7 C atoms, lower alkenyl, aryl-lower alkyl, lower alkanoyl with 3–7 C atoms, benzoyl, halogenobenzoyl, lower alkylbenzoyl, lower alkoxybenzoyl, trifluoromethylbenzoyl, hydroxybenzoyl, lower alkanoyloxybenzoyl, α-naphthoyl, β-naphthoyl or pyridylcarbonyl, or two of the radicals $R_2$, $R_3$ and $R_5$ are hydrogen and the third of the radicals $R_2$, $R_3$ and $R_5$ is lower alkyl, lower alkenyl, aryllower alkyl, lower alkanoyl or aroyl, or two of the radicals $R_2$, $R_3$ and $R_5$ are lower alkylidene or aryl-lower alkylidene and the third of the radicals $R_2$, $R_3$ and $R_5$ is hydrogen, lower alkyl, lower alkenyl, aryl-lower alkyl, lower alkanoyl or aroyl, with one of the radicals $R_2$, $R_3$ and $R_5$ being different from hydrogen if the other two of these radicals are hydrogen, and with one of the radicals $R_2$, $R_3$ and $R_5$ being different from methyl if the other two of these radicals are methyl, and with one of the radicals $R_2$, $R_3$ and $R_5$ being different from acetyl if the other two of these radicals are acetyl.

Amongst the compounds Ic of the formula I there should particularly be singled out those wherein —A—O— is a radical of the formula —CHOR$_5$—CH$_2$—O— and $R_2$, $R_3$ and $R_5$ independently of one another are hydrogen, lower alkyl, lower alkenyl, benzyl, lower alkylbenzyl, lower alkoxybenzyl, halogenobenzyl, trifluoromethylbenzyl, lower alkanoyl, benzoyl, halogenobenzoyl, lower alkylbenzoyl, lower alkoxybenzoyl, trifluoromethylbenzoyl, hydroxybenozyl, lower alkanoyloxybenzoyl or pyridylcarbonyl, or two of the radicals $R_2$, $R_3$ and $R_5$ are lower alkylidene or benzylidene, with one of the radicals $R_2$, $R_3$ and $R_5$ being different from hydrogen if the other two of these radicals are hydrogen, one of the radicals $R_2$, $R_3$ and $R_5$ being different from methyl if the other two of these radicals are methyl, and one of the radicals $R_2$, $R_3$ and $R_5$ being different from acetyl if the other two of these radicals are acetyl.

Above all, there should be mentioned compounds Ic of the formula I wherein —A—O— is a radical of the formula —$CHOR_5$—$CH_2$—O—, $R_2$ is hydrogen, lower alkyl with 1–3 C atoms, dilower alkylamino-lower alkyl with a total of up to 7 C atoms, benzyl, chlorobenzyl, lower alkanoyl with 2-C atoms, benzoyl, o-hydroxybenzoyl, o-lower alkanoyloxybenzoyl with 2–4 C atoms in the o-lower alkanoyloxy part, naphthoyl lower alkylcarbamoyl with up to 4 C atoms, phenylcarbamoyl, lower alkysulphonyl with 1–3 C atoms, phenylsulphonyl, toluenesulphonyl or pyridylcarbonyl and $R_3$ and $R_5$ independently of one another are hydrogen, lower alkyl with 1–3 C atoms, benzyl, chlorobenzyl or benzoyl, with one of the radicals $R_2$, $R_3$ and $R_5$ being different from hydrogen if the other two of these radicals are hydrogen, and with one of the radicals $R_2$, $R_3$ and $R_5$ being different from methyl if the other two of these radicals are methyl and with one of the radicals $R_2$, $R_3$ and $R_5$ being different from acetyl if the other two of these radicals are acetyl.

Particularly suitable compounds Ic of the formula I are those wherein —A—O— is a —$CHOR_5$—$CH_2$—O— radical, $R_2$ is lower alkanoyl with 2-4 C atoms, benzoyl, o-hydroxybenzoyl, o-lower alkanoyloxybenzoyl with 2–4 C atoms in the o-lower alkanoyloxy part, naphthoyl or pyridylcarbonyl, and $R_3$ and $R_5$ independently of one another are hydrogen, lower alkyl with 2 or 3 C atoms, benzyl, chlorobenzyl, benzoyl, or o-hydroxybenzoyl.

Further compounds Ic of the formula I which are particularly suitable are those wherein —A—O— is a —$CHOR_5$—$CH_2$—O— radical, $R_2$ is hydrogen and $R_3$ and $R_5$ independently of one another are lower alkyl with 1-3 C atoms, allyl, methallyl, benzyl or chlorobenzyl.

Compounds Ic of the formula I which should be singled out above all are those wherein —A—O— is a —$CHOR_5$—$CH_2$—O— radical, $R_2$ is hydrogen, lower alkanoyl with 2-4 C atoms, benzoyl, o-hydroxybenzoyl, o-acetoxybenzoyl, naphthoyl or pyridylcarbonyl, and $R_3$ and $R_5$ independently of one another are lower alkyl with 1-3 C atoms, benzyl, chlorobenzyl, benzoyl, o-hydroxybenzoyl, o-actoxybenzoyl or naphthoyl.

Compounds to be particularly singled out are those described in the examples, and very especially 1,6-anhydro-3,5-di-0-benzyl-2-0-nicotinoyl-β-D-glucofuranose, 1,6-anhydro-2-0-benzoyl-3,5-di-0-benzyl-β-D-glucofuranose, 1,6-anhydro-3,5-di-0-benzyl-β-D-allofuranose, 1,6-anhydro-2-0-benzoyl-3,5-di-0-benzyl-β-D-allofuranose and 1,6-anhydro-3,5-di-0-benzyl-β-D-glucofuranose.

The new anhydrofuranose derivatives can be manufactured according to methods which are in themselves known.

Thus, the new anhydrofuranose derivatives can be manufactured by treating a new compound of the formula IV

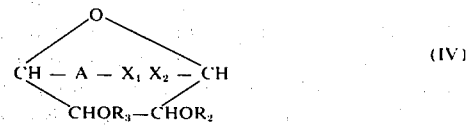

wherein A, $R_2$ and $R_3$ have the above meanings and one of the radicals $X_1$ and $X_2$ is a radical which can be split to leave a negatively charged oxygen atom, and the other is a radical which can be split to leave a carbonium ion, with an acid or base.

A radical $X_1$ or $X_2$ which can be split to leave a negatively charged oxygen atom is, in particular, the hydroxyl group.

A radical $X_1$ which can be split to leave a negatively charged oxygen atom is furthermore, especially, reactive etherified hydroxyl. Reactive etherified hydroxyl is above all arylmethoxy, such as lower alkylbenzyloxy, lower alkoxybenzyloxy, halogenobenzyloxy and especially benzyloxy.

A radical $X_2$ which can be split to leave a negatively charged oxygen atom is furthermore acyloxy. Acyloxy is, for example, alkanoyloxy, such as lower alkanoyloxy, for example propionyloxy or especially acetoxy, as well as aroyloxy, such as lower alkylbenzoyloxy, for example methylbenzoyloxy, lower alkoxybenzoyloxy, for example methoxybenzoyloxy, halogenobenzoyloxy, for example chlorobenzoyloxy, or especially benzoyloxy.

A radical $X_1$ or $X_2$ which can be split off to leave a carbonium ion is especially a halogen atom, such as fluorine, chlorine, bromine or iodine.

A radical $X_1$ which can be split off to leave a carbonium ion is furthermore, in particular, a reactive esterified hydroxyl, such as a hydroxyl group esterified by a strong inorganic or organic acid, such as sulphuric acid, or an organic sulphonic acid, such as an aromatic or aliphatic sulphonic acid, for example benzenesulphonic acid, 4-bromobenzenesulphonic acid, 4-toluenesulphonic acid, or a lower alkanesulphonic acid, for example methanesulphonic acid or ethanesulphonic acid. Thus, $X_1$ in particular represents benzenesulphonyloxy, 4-bromobenzenesulphonyloxy, 4-toluenesulphonyloxy, methanesulphonyloxy or ethanesulphonyloxy.

A radical $X_2$ which can be split off to leave a carbonium ion is furthermore, in particular, free, reactive esterified or reactive etherified hydroxyl, or $X_2$ together with $OR_2$ forms epoxy. Reactive esterified hydroxyl $X_2$ is, in particular, hydroxyl esterified by a strong inorganic or organic acid, such as sulphuric acid or a lower alkanecarboxylic acid, such as propionic acid or above all acetic acid, or an arylcarboxylic acid, such as benzoic acid, or halogenobenzoic acid, for example chlorobenzoic acid. Thus, $X_2$ in particular represents benzoyloxy, propoxy or above all acetoxy. Reactive etherified hydroxyl $X_2$ is, in particular, an aliphatically etherified hydroxyl group, such as cycloalkyloxy, for example cyclohexyloxy, aryl-lower alkoxy, such as benzyloxy, or above all alkoxy, such as lower alkoxy, for example methoxy or ethoxy.

Particularly suitable radicals $X_2$ which can be split off to leave a carbonium ion are hydroxyl, methoxy, ethoxy, epoxy formed together with $OR_2$, and especially halogen or lower alkanoyloxy, for example acetoxy.

Particulalrly suitable radicals $X_1$ which can be split off to leave a carbonium ion are halogen or sulphonyloxy groups, such as p-toluenesulphonyloxy.

The treatment of a compound of the formula IV with acid or base is in particular carried out with a Lewis acid, a strong inorganic acid or an inorganic or organic base.

Lewis acids are electron-acceptors, for example those in which an atom possesses fewer electrons than a complete octet, such as boron-tri-lower alkyl, for example boron-trimethyl, or especially boron-trihalides, for example boron trifluoride, boron trichloride or boron tribromide. However, suitable Lewis acids are above all also metal halides, in which the central atom can accommodate more than eight external electrons, such as titanium tetrahalides, niobium pentahalides or tantalum pentahalides, for example titanium tetrachloride, niobium pentachloride or tantalum pentachloride, or above all tin dihalides, zinc dihalides and very particularly tin tetrahalides, for example tin dichloride, zinc dichloride and above all tin tetrachloride.

Examples of suitable strong inorganic acids are hydrogen halide acids, especially hydrofluoric acid.

Suitable inorgganic bases are in particular alkali metal hydroxides or alkaline earth metal hydroxides, or corresponding carbonates or bicarbonates, such as sodium hydroxide, potassium hydroxide or especially barium hydroxide or especially barium hydroxide or sodium bicarbonate. Suitable inorganic bases are in particular alkali metal alcoholates, such as alkali metal lower alkanolates, for example sodium ethylate, potassium tertiary-butylate or above all sodium methylate, as well as nitrogen bases, such as, in particular, sterically hindered nitrogen bases, for example tertiary amines or quaternary ammonium salts of tertiary amines, such as tri-lower alkylamines, for example triethylamine or especially trimethylamine, or tri-lower alkylammonium halides, for example triethylammonium bromide or especially trimethylammonium bromide, or also aromatic nitrogen-containing heterocyclic compounds, such as quinoline or pyridine.

If compounds of the formula IV wherein one of the radicals $X_1$ and $X_2$ is hydroxyl and the other is halogen, are concerned, the treatment can advantageously be carried out with an acid or a base. If $X_1$ is hydroxyl and $X_2$ is halogen, examples of suitable acids are hydrofluoric acid or especially Lewis acids, and suitable bases are, for example, sterically hindered organic nitrogen bases. If $X_1$ is halogen and $X_2$ is hydroxyl, suitable acids are, for example hydrofluoric acid or especially Lewis acids, and suitable bases are, for example, inorganic or organic bases.

If $X_1$ is a radical which can be split to leave a negatively charged oxygen atom and $X_2$ is a radical which can be split off to leave a carbonium ion, the treatment is preferably carried out with acids, such as with strong inorganic acids or Lewis acids. The treatment can be carried out in a manner which is in itself known, with cooling, for example at $-10°C$ to about $+10°C$, or at room temperature, that is to say at about $+20°C$. To accelerate the reaction, the mixture can also be warmed gently, for example to about 40°C. The treatment is advantageously carried out in a solvent, appropriately in halogenated hydrocarbons, such as in halogeno-lower alkanes, for example methylene chloride, chloroform or especially dichloroethane, or in aromatics, such as toluene or xylene, preferably with exclusion of water.

If $X_1$ is a radical which can be split off to leave a carbonium ion and which is generally split off with inversion at the C atom to which $X_1$ is bonded, and if $X_2$ is a radical which can be split to leave a negatively charged oxygen atom, the treatment is preferably carried out with bases, such as with inorganic or organic bases. The treatment can be carried out in a manner which is in itself known, with cooling, for example at $-10°C$ to about $+10°C$, or at room temperature, that is to say at about $+20°C$. To accelerate the reaction, the mixture can also be warmed gently, for example to about 40°–60°. The treatment is advantageously carried out in a solvent, appropriately in water, in alcohols, such as lower alkanol, for example methanol or ethanol, or in ethers, such as dimethyl ether, dioxane or tetrahydrofurane, or in acetone.

The new anhydrofuranose derivatives can further also be obtained by introducing at least one radical $R_2$, $R_3$ and/or $R_5$ or $R_6$, which is different from hydrogen, into a compound of the formula VI

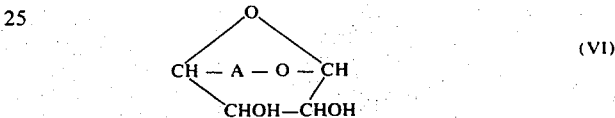

wherein A is a $-CHOH-CH_2-O-$ or $-CH(CH_2OH)-O-$ radical.

Thus, it is possible to react a compound of the formula VI with a reactive ester of an alkanol, alkenol or arylalkanol. A reactive ester of an alkanol, alkenol or arylalkanol is in particular an ester with a strong inorganic or organic acid, such as, above all, with a hydrogen halide acid, for example hydrochlorice acid, hydrobromic acid or hydriodic acid, or sulphuric acid, or with an organic sulphonic acid, such as with an aromatic or aliphatic sulphonic acid, for example benzenesulphonic acid, 4-bromobenzenesulphonic acid, 4-toluenesulphonic acid, or a lower alkanesulphonic acid, for example methanesulphonic acid or ethanesulphonic acid. Thus, an alkyl chloride, alkyl bromide or alkyl iodide, a benzenesulphonyloxyalkane, 4-bromobenzenesulphonyloxyalkane, 4-toluenesulphonyloxyalkane, methanesulphonyloxyalkane or ethanesulphonyloxyalkane or a corresponding derivative of an alkenol or arylalkanol is advantageously used for the reaction with a compound of the formula VI. Advantageously, the reaction is carried out in the presence of a basic agent, such as an alkali metal hydroxide, for example sodium hydroxide or potassium hydroxide, an alkali metal carbonate, such as sodium carbonate or potassium carbonate or of an alkali metal bicarbonate, such as sodium bicarbonate or potassium bicarbonate, or in the presence of silver oxide.

Furthermore, a compound of the formula VI, wherein at least one hydroxyl group is converted into a reactive esterified hydroxyl group, especially into a halogen atom, such as bromine or iodine, can be reacted with an alkanol, alkenol or arylalkanol or a metal salt, such as a sodium salt.

Furthermore, an acyl radical $R_2$, $R_3$ and/or $R_5$ or $R_6$ can be introduced into a compound of the formula VI, wherein at least one hydroxyl group is converted into a reactive esterified hydroxyl group, especially into a halogen atom, such as bromine or iodine. In a compound of the formula VI possessing free hydroxyl groups, an acyl radical $R_2$, $R_3$ and/or $R_5$ or $R_6$ can in particular be introduced according to acylating processes which are in themselves known, for example by reacting a compound of the formula VI with an acid corresponding to the acyl radical or preferably with an appropriate reactive derivative thereof.

A preferably used acid derivative, especially a derivative of a carboxylic acid, is, for example, a halide, such as a chloride, or an anhydride, including a mixed anhydride, such as the anhydride with a carbonic acid lower alkyl half-ester (which can be obtained, for example, by reaction of a suitable salt, such as of an ammonium salt, of the acid with a halogenoformic acid lower alkyl ester, for example chloroformic acid ethyl ester), or with a suitable optionally substituted lower alkanecarboxylic acid, for example trichloroacetic acid or pivalic acid, as well as an activated ester of such an acid, for example an ester with a N-hydroxyamino or N-hydroxyimino compound, such as N-hydroxysuccinimide, or with a lower alkanol, especially methanol, or phenol, which contains electron-attracting groups, for example nitro groups, acyl groups, such as lower alkanoyl groups, for example acetyl groups, or aroyl groups, for example benzoyl groups, or optionally functionally modified carboxyl groups, such as carbo-lower alkoxy groups, for example carbomethoxy groups or carboethoxy groups, carbamoyl groups, for example N,N-dimethyl-carbamoyl groups, for example N,N-dimethyl-carbamoyl groups or nitrile groups, for example cyanomethanol or 4-nitrophenol.

If necessary, the reaction is carried out in the presence of a suitable condensation agent and/or catalyst. An acid can be used, for example, in the presence of a dehydrating condensation agent, such as a carbodiimide, for example dicyclohexylcarbodiimide, optionally together with a catalyst, such as a copper salt, for example copper-I chloride or copper-II chloride, or a β-alkinylamine or lower alkoxyacetylene compound, an acid halide can be used, for example, in the presence of a basic acid-binding condensation agent, such as pyridine or tri-lower alkylamine, for example triethylamine, and an anhydride can be used, for example, in the presence of a suitable carbodiimide, and optionally of a catalyst, such as zinc chloride.

If a compound of the formula VI, in which at least one hydroxyl group is in the form of a reactive esterified hydroxyl group, is used, an acyl radical $R_2$, $R_3$ and/or $R_5$ or $R_6$ can advantageously be introduced by reaction with a salt of an acid corresponding to the acyl radical. Examples of suitable salts are alkali metal salts, such as sodium salts or potassium salts, or also silver salts.

In resulting compounds it is possible, within the framework of the final substances, to modify, introduce or split off substituents in the usual manner; alternatively, compounds obtained can be converted into other final substances in the usual manner.

Thus it is possible, in resulting compounds which contain at least one free hydroxyl group, to convert this into a radical $R_2$, $R_3$, $R_5$ or $R_6$ which is different from hydrogen, especially as described above.

It is furthermore possible, in resulting compounds which contain at least one alkenyl radical $R_2$, $R_3$, $R_5$ or $R_6$, to hydrogenate this radical, for example with hydrogen in the presence of a catalyst, such as with hydrogen in the presence of a palladium catalyst or platinum catalyst. In doing so, groups which can be split off hydrogenolytically can be split off at the same time.

Furthermore it is possible, in resulting compounds which possess at least one radical which can be split off, to split off this radical. Thus it is in particular possible, in resulting compounds which possess a radical which can be split off solvolytically, to split this off solvolytically, for example hydrolytically, or alcoholytically. A radical which can be split off hydrolytically or alcoholytically is, for example, an ylidene radical which is formed by two radicals $R_2$, $R_3$ and $R_5$ or $R_6$ together, and which is split off in the usual manner by treatment with water or an alcohol, such as a lower alkanol, for example methanol or ethanol, in the presence of an acid, for example of an inorganic acid, such as a hydrogen halide acid, for example hydrochloric acid, or of an organic acid, such as a carboxylic acid or dicarboxylic acid, for example acetic acid, or a sulphonic acid, such as 4-toluenesulphonic acid, under mild conditions. This splitting off is preferably carried out in the presence of a diluent, and a reactant, inter alia an alcoholic reagent or an organic acid, such as acetic acid, can simultaneously also serve as this diluent; it is also possible to use a mixture of solvents or diluents. If an alcohol is used, the reaction is preferably carried out in the presence of a hydrogen halide acid, especially hydrochloric acid, and if water is used, the reaction is preferably carried out in the presence of an organic carboxylic acid, in particular formic acid or oxalic acid, especially in the presence of acetic acid, the reaction being carried out, if necessary, with cooling, but above all at room temperature or elevated temperature, for example at about 25°C to about 150°C), optionally in a closed vessel under pressure and/or in an inert gas atmosphere, such as a nitrogen atmosphere. If, in the above splitting-off reaction, an alcohol is used as the reagent in the presence of an anhydrous acid, especially hydrogen chloride, one of the two hydroxyl groups conjointly etherified by the ylidene radical can be etherified simultaneously during the liberation reaction. The splitting-off reaction can therefore simultaneously be used to introduce an etherified hydroxyl group into a compound obtainable according to the process.

In a resulting compound having a group which can be split hydrogenolytically, above all a hydroxyl group etherified by an optionally substituted benzyl radical, or a benzylidenedioxy group, such a group can be converted into a hydroxyl group according to known methods, for example by treatment with nascent or catalytically activated hydrogen, such as hydrogen in the presence of a noble metal catalyst, for example a palladium catalyst.

In a resulting compound with an acyl radical $R_2$, $R_3$ and/or $R_5$ or $R_6$, an acyloxy group can be converted into a hydroxyl group, for example by hydrolysis or by alcoholysis, preferably in the presence of a mild basic agent, such as an alkali metal bicarbonate. The liberation of the hydroxyl group can optionally also take place during the splitting off of an ylidene radical, for example on treatment of an appropriate compound with an alcohol in the presence of an acid. If, when splitting off an ylidene group, water in the presence of an acid is used, the two hydroxyl groups etherified by such a group are obtained in the free form. An esterified hydroxyl group can also be converted into another esterified hydroxyl group.

In a resulting compound with an acyl radical $R_2$, $R_3$ and/or $R_5$ or $R_6$, this radical can be converted in the usual manner into an alkyl radical, alkenyl radical or arylalkyl radical. This conversion into a correspondingly etherified hydroxyl group is preferably carried out by treating the starting material with an appropriate alcohol which is optionally reactively esterified, for example as indicated above. The reaction of acyloxy groups of the starting material is preferably carried out in the presence of an acid, especially of a mineral acid, such as hydrogen halide acid, for example hydrochloric acid, or in particular, in the case of the reaction with a reactive esterified alcohol, in the presence of a suitable acid-binding agent, such as, for example, a silver, lead or mercury salt or a corresponding oxide, or in the presence of a tertiary base, it also being possible to use metal derivatives of the alcohol, such as the correspondign alkali metal compounds, for example sodium or potassium compounds, or alkaline earth metal compounds, for example magnesium or silver compounds. Instead of an acid, it is also possible to use an acid ion exchange resin. This reaction is preferably carried out in the presence of a solvent, and an alcoholic reagent can also be used as the solvent.

Compounds with basic groups can be in the form of acid addition salts, especially pharmaceutically usable non-toxic salts, for example salts with inorganic acids, such as hydrochloric acid, hydrobromic acid, sulphuric acid or phosphoric acid, or with organic, such as aliphatic, cycloaliphatic, cycloaliphaticaliphatic, aromatic, araliphatic, heterocyclic or heterocyclicaliphatic, carboxylic or sulphonic acids, for example acetic acid, propionic acid, succinic acid, glycollic acid, lactic acid, malic acid, tartaric acid, citric acid, ascorbic acid, maleic acid, phenylacetic acid, benzoic acid, 4-aminobenzoic acid, anthranilic acid, 4-hydroxybenzoic acid, salicylic acid, aminosalicylic acid, embonic acid or nicotinic acid, as well as methanesulphonic acid, ethanesulphonic acid, 2-hydroxyethanesulphonic acid, ethylenesulphonic acid, benzenesulphonic acid, p-toluenesulphonic acid, naphthalenesulphonic acid, sulphanilic acid or cyclohexylsulphamic acid. Salts of this nature can be obtained, for example, by treating free compounds which contain basic groups with the acids or with suitable anion exchangers.

Because of the close relationships between the new compounds in the free form and in the form of their salts, it is intended, in the preceding and following text, that the free compounds or the salts be understood, where approriate, also as the corresponding salts or free compounds, respectively, with regard to general sense and intended purpose.

The new compounds can be in the form of isomer mixtures, such as racemates or diastereoisomer mixtures, or in the form of pure isomers, such as optically active components. The separation of resulting isomer mixtures into the pure isomers can take place according to the known methods. Racemates can, for example, be separated into their optically active antipodes, for example on the basis of physico-chemical differences, such as, for example, differences in solubility, of their diastereomeric salts, or by fractional cyrstallisation from an optically active solvent, or by chromatography, especially thin layer chromatography, on an optically active carrier. Advantageously, the pharmacologically more active or less toxic pure isomer, especially the more active or less toxic active antipode, is isolated.

The processes described above are carried out according to methods which are in themselves known, in the absence or preferably in the presence of diluents or solvents, if necessary with cooling or warming, under elevated pressure and/or in an inert gas atmosphere, such as a nitrogen atmosphere.

Particularly gentle reaction conditions must be used where necessary, taking into account all substituents present in the molecule, especially if easily hydrolysable O-acyl radicals are present; such conditions are short reaction times, the use of mild acid or basic agents in low concentration, stoichiometric ratios and the choice of suitable catalysts, solvents and conditions of temperature and/or pressure.

The invention also relates to those embodiments of the process in which a compound obtainable as an intermediate product at any stage of the process is used as the starting point and the missing process steps are carried out, or the process is stopped at any stage, or a starting substance is formed under the reaction conditions or is used in the form of a reactive derivative or salt. Preferably, those starting substances are used which, according to the process, lead to the compounds described above as being particularly valuable.

The starting substances are known or can be manufactured according to methods which are in themselves known.

The invention further relates to pharmaceutical preparations which contain an anhydrofuranose derivative of the formula I, wherein $R_2$ and $R_3$ independently of one another are hydrogen, alkyl, alkenyl, arylalkyl or acyl and $-A-O-$ is a $-CHOR_5-CH_2-O-$ or $-CH(CH_2OR_6)-O-$ radical, wherein $R_5$ or $R_6$ has one of the meanings indicated for $R_2$, or wherein two of the radicals $R_2$, $R_3$ and $R_5$ or $R_6$ together represent an ylidene radical.

Preferred pharmaceutical preparations are those which contain an anhydrofuranose derivative of the ranges of compounds or individual compounds which have been particularly singled out.

The pharmaceutical preparations according to the invention advantageously contain an active amount of the active substance together with, or mixed with, inorganic or organic, solid or liquid, pharmaceutically usable excipients, which are suitable for enteral, parenteral or topical administration. Suitable substances for forming the excipients are those which do not react with the anhydrofuranose derivatives, such as, for example, water, gelatine, lactose, starch, stearyl alcohol, magnesium stearate, talc, vegetable oils, benzyl alcohols, gum, propylene glycols, white petroleum jelly or other known medicinal excipients. The pharmaceutical preparations can, for example, be in the form of tablets, dragées, capsules, suppositories, creams or ointments or in a liquid form as solutions (for example as an elixir or syrup), suspensions or emulsions. The pharmaceutical preparations can be sterilised and/or contain auxiliaries, for example preservatives, stabilisers, wetting agents or emulsifiers, solubilising agents, salts for regulating the osmotic pressure and/or buffers. The present pharmaceutical preparations which can, if desired, contain additional pharmacologically valuable substances, are manufactured in a manner which is itself known, for example by means of conventional mixing, granulating or dragée-making processes, and contain from about 0.1 to about 75%, especially from about 1 to about 50%, of the active substance.

The invention further relates to the treatment of warm-blooded animals to achieve fibrinolytic, thrombolytic and/or anti-inflammatory effects by administration of a pharmaceutical preparation according to the invention. Advantageously, the daily dose for warm-blooded animal weighing about 70 kg is about 50–500 mg per day, preferably about 100–300 mg per day.

The examples which follow serve to illustrate the invention.

EXAMPLE 1

A solution of 4.7 g (2.14 ml, 0.0181 mol) of tin tetrachloride in 20 ml of absolute dichloroethane is added dropwise, at 10°C, to 34.8 g (0.0652 mol) of 1,2-di-O-acetyl-3,5,6-tri-O-benzyl-D-glucofuranose in 150 ml of absolute toluene, whilst stirring. After stirring for 3 hours at about 20°C, only traces of 1,2-di-O-acetyl-3,5,6-tri-O-benzyl-α-D-glucofuranose still show in a thin layer chromatogram (silica gel, cyclohexane: ethyl acetate = 2:1). The solution is poured into a saturated sodium bicarbonate solution whilst stirring vigorously, the mixture is diluted with ether, and the precipitate which has formed in filtered off using a filtration aid. The organic phase is washed with water, dried over sodium sulphate and filtered, and the filtrate is evaporated under reduced pressure. The syrup which remains is twice extracted with petroleum ether and the residue is dried at 0.01 mm Hg. The petroleum ether extract is concentrated under reduced pressure to give a firm syrup, which is also twice extracted with hexane. 2-O-Acetyl-1,6-anhydro-3,5-di-O-benzyl-β -D-glucolfuranose is thus obtained in the form of a viscous syrup, which can be purified further, for example whilst undergoing saponification. The syrupy substance has an optical rotation $[\alpha]_D^{20} = -20.6°$ (chloroform).

EXAMPLE 2

22.6 g of syrupy 2-O-acetyl-1,6-anhydro-3,5-di-O-benzyl-β-D-glucolfuranose in a solution of 0.5 g of potassium carbonate in 400 ml of methanol are stirred for 15 hours at about 20°C. The reaction mixture is evaporated, the residue is taken up in ether and the ether solution is washed with water. After drying, filtration and evaporation of the ether phase, a syrup is obtained, which crystallises on treatment with ether. Two recrystallisations from ether at −15°C or from ether:cyclohexane = 1:1 yield 1,6-anhydro-3,5-di-O-benzyl-β-D-glucofuranose in the form of crystals of melting point 112°–113°C and $[\alpha]_D^{20} = -8.7°$ (chloroform). Chromatography of the mother liquor on silica gel in cyclohexane:ethyl acetate = 1:1 gives further 1,6-anhydro-3,5-di-O-benzyl-β-D-glucofuranose in the crystalline form.

EXAMPLE 3

1.6 g of 1,6-anhydro-3,5-di-O-benzyl-β-D-glucofuranose in 70 ml of methanol are hyrogenated at normal pressure with 300 mg of 5 percent strength palladium on charcoal. After 10 hours, the starting material has largely disappeared; thin layer chromatography (silica gel, chloroform: acetone = 9:1). The catalyst is filtered off, the filtrate is evaporated to dryness and the residue is chromatographed on 40 g of silica gel, in chloroform: acetone = 9:1. 1,6-Anhydro-3-O-benxzyl-β-D-glucofuranose is obtained in the form of the colourless crystals of melting point 102-103°C and $[\alpha]_D^{20} = +23.1°$ (water).

EXAMPLE 4

A solution of 3.72 g of nicotinic acid chloride in 10 ml of pyridine is added dropwise, at about 25°C, to a solution of 6 g of 1,6-anhydro-3,5-di-O-benzyl-β-D-glucofuranose in 15 ml of pyridine. After one hour at about 25°C, the reation mixture is partitioned between water and ether, the ether phase is washed with sodium bicarbonate solution and water until pH 7 is reached, and is dried with sodium sulphate, and after concentration in vacuo and recrystallisation from chloroform/petroleum ether colourless crystals of melting point 98°–100°C and $[\beta]_D^{20} = +13.6°$ (CHCl$_3$) are obtained, whilst further 1,6-anhydro-3,5-di-O-benzyl-2-O-nicotinoyl-β-D-glucofuranose is obtained from the mother liquor.

EXAMPLE 5

2.7 g of potassium hydroxide powder are added to 7 g of 1,6-anhydro-3,5-di-O-benzyl-β-D-glucofuranose in 30 ml of absolute dimethylsulphoxide and 5.2 g (4.7 ml) of benzyl chloride are added dropwise thereto. When the reaction has subsided, the mixture is left to stand for 1.5 hours at about 25°C. The reaction solution is evaporated in vacuo, the residue is taken up in ether and water and the ether phase is washed with water until neutral. After drying and evaporation, an oil is obtained, which is chromatographed on 200 g of silica gel, in chloroform. After drying at 0.01 mm Hg, a colourless oil is obtained, which crystallises slowly, melting point 50°–55°C, $[\alpha]_D^{20} = +8.3°$ (CHCl$_3$), and which is 1,6-anhydro-2,3,5-tri-O-benzyl-β-D-glucofuranose.

EXAMPLE 6

1 g of sodium borohydride is added to 11.4 g of 1,6-anhydro-3,5-di-O-benzyl-2-oxo-β-D-glucofuranose in 140 ml of methanol, whilst cooling with ice. After 1 hour at about 25°C, the mixture is evaporated in vacuo, the residue is taken up in ether and the ether phase is washed with water until neutral. After drying, and evaporation of the ether phase, crystals are obtained, which are recrystallised from ethyl acetate-petroleum ether, melting point 117°–119°C $[\alpha]_D^{20} = -38.6°$ (CHCl$_3$), whilst further 1,6-anhydro-3,5-di-O-benzyl-β-D-mannofuranose is obtained from the mother liquor.

The starting material can be obtained as follows:

30 g of 1,6-anhydro-3,5-di-O-benzyl-β-D-glucofuranose are added in portions to a solution of 12 g of tetraphosphorus decaoxide (P$_4$O$_{10}$) in 200 ml of absolute dimethylsulphoxide at about 25°C, whilst stirring. After 20 hours at about 25°C, the reaction solution is added dropwise to 25 g of sodium bicarbonate in 500 ml of water, and the mixture is diluted with 1 litre of water and extracted with ether. The ether phase is washed three times with water and once with sodium chloride solution and is dried over magnesium sulphate. This yields a yellow oil which is directly processed further and which is 1,6-anhydro-3,5-di-O-benzyl-2-oxo-β-D-glucofuranose.

EXAMPLE 7

2.61 g (2.05 ml) of dimethyl sulphate are added dropwise to a solution of 7 g of 1,6-anhydro-3,5-di-O- benzyl-β-D-glucofuranose and 1.42 g of potassium hydroxide powder in 30 ml of absolute dimethylsulphoxide. After 2 and 4 hours at about 25°C, a further 1.42 g of potassium hydroxide and 2.05 ml of dimethyl sulphate are added and thereafter the reaction mixture is heated for 2 hours to 60°C and concentrated in vacuo. The residue is taken up in water and ether and the ether phase is washed with water until neutral, dried and evaporated. The resulting oil is filtered through 100 g of silica gel in chloroform and a colourless oil, $[\alpha]_D^{20} = -3°$ (CHCl$_3$), is obtained, which is 1,6-anhydro-3,5-di-O-benzyl-2-O-methyl-β-D-glucofuranose.

EXAMPLE 8

A solution of 7 g of 1,6-anhydro-3,5-di-O-benzyl-β-D-glucofuranose, 9.65 g (10 ml) of methyl isocyanate and 0.5 ml of triethylamine in 110 ml of benzene is left to stand for 15 hours at about 25°C and evaporated to dryness, and the resulting syrup is dried at 0.01 mm Hg. A viscous, colourless syrup, $[\alpha]_D^{20} = -16.9°$ (CHCl$_3$), is obtained, which is 1,6-anhydro-3,5-di-O-benzyl-2-(N-methylcarbamoyl)-β-D-glucofuranose.

EXAMPLE 9

A solution of 7 g of 1,6-anhydro-3,5-di-O-benzyl-β-D-glucofuranose, 8.15 g (7.45 ml) of phenyl isocyanate and 10 drops of triethylamine in 100 ml of benzene is heated under reflux for 4 hours. The mixture is evaporated to dryness and the syrupy residue is chromatographed on 350 g of silica gel in chloroform/acetone = 50:1, and a viscous syrup, $[\alpha]_D^{20} = -27.1°$ (CHCl$_3$) is obtained, which is 1,6-anhydro-3,5-di-O-benzyl-2-O-(N-phenylcarbamoyl)-β-D-glucofuranose.

EXAMPLE 10

2.3 g (1.91 ml) of benzoyl chloride in 10 ml of chloroform are added to 5 g of 1,6-anhydro-3,5-di-O-benzyl-β-D-glucofuranose in 30 ml of pyridine and the mixture is left to stand for 15 hours at about 25°C. Water is added, the mixture is evaporated in vacuo to give a syrup, this is taken up in ether and the ether phase is extracted by shaking with 1 N hydrochloric acid, 5% strength sodium bicarbonate solution and water and is dried and evaporated. Crystals are obtained, which are recrystallised from ether/petroleum ether, melting point 81°–83°C, $[\alpha]_D^{20} = +7.3°$ (CHCl$_3$), and which are 1,6-anhydro-2-O-benzoyl-3,5-di-O-benzyl-β-D-glucofuranose.

EXAMPLE 11

6.2 g of tosyl chloride in 20 ml of chloroform are added to a cooled solution of 5 g of 1,6-anhydro-3,5-di-O-benzyl-β-D-glucofuranose in 50 ml of pyridine. After 5 hours at 60°C and 15 hours at about 25°C, water is added, the mixture is evaporated in vacuo to give a syrup, this is taken up in ether and the ether solution is extracted by shaking with 1 N hydrochloric acid, 5% strength sodium bicarbonate solution and water. After drying and evaporation, the ether phase yields crystals which are recrystallised from methanol, melting point 92°–92.5°C, $[\alpha]_D^{20} = -40.6°$ (CHCl$_3$), and which are 1,6-anhydro-3,5-di-O-benzyl-2-O-(p-toluenesulphonyl)-β-D-glucofuranose.

EXAMPLE 12

3.68 g (2.44 ml) of mesyl chloride in 20 ml of chloroform are added to a cooled solution of 5 g of 1,6-anhydro-3,5-di-O-benzyl-β-D-glucofuranose in 50 ml of pyridine and the mixture is left to stand for 15 hours at about 25°C. It is worked up as described in Example 11 and crystals are obtained, which are recrystallised from methanol, melting point 142°–144°C, $[\alpha]_D^{20} = -22.4°$ (CHCl$_3$), and which are 1,6-anhydro-3,5-di-O-benzyl-2-O-methylsulphonyl-β-D-glucofuranose.

EXAMPLE 13

3.5 g of tin tetrachloride in 20 ml of methylene chloride are added dropwise to a solution of 22 g of 1,2-di-O-acetyl-3-O-methyl-5,6-di-O-benzyl-D-glucofuranose in 100 ml of methylene chloride at about 25°C over the course of 5 minutes in a nitrogen atmosphere and whilst excluding moisture. After stirring for four hours at 20°C, the reaction mixture is poured into 300 ml of saturated sodium bicarbonate solution and the whole is extracted with ether. The ether solution is washed with water until neutral, dried over sodium sulphate, filtered and evaporated. After degassing the residue in a high vacuum at 60°C, 2-O-acetyl-1,6-anhydro-5-O-benzyl-3-O-methyl-β-D-glucofuranose is obtained as a yellowish oil of $R_f = 0.23$ (thin layer chromatography on silica gel) cyclohexane/ethyl acetate (2:1); IR 1,750 cm$^{-1}$ (carbonyl band).

EXAMPLE 14

A solution of 10 g of 2-O-acetyl-1,6-anhydro-5-O-benzyl-3-O-methyl-β-D-glucofuranose in 200 ml of dry methanol is stirred with 0.3 g of potassium carbonate for 16 hours at about 25°C whilst excluding moisture. Thereafter the methanol is distilled off under reduced pressure and the residue is taken up in ether. The ether solution is washed with water until neutral, dried over sodium sulphate, filtered and evaporated. The residue is purified by column chromatography on silica gel, eluting with methylene chloride/methanol (15:1). 1,6-Anhydro-5-O-benzyl-3-O-methyl-β-D-glucofuranose, obtained in this way and degassed in a high vacuum, is obtained in the form of a yellowish oil of $R_f = 0.45$ (thin layer chromatography on silica gel) in the system methylene chloride/methanol (15:1), with $[\alpha]_D^{20} = -8° \pm 1°$ (chloroform, c = 1.234).

EXAMPLE 15

A solution of 26.7 g of 1,2-di-O-acetyl-3-O-n-propyl-5,6-di-O-benzyl-D-glucofuranose in 100 ml of methylene chloride is treated with a solution of 3.9 g of tin tetrachloride in 20 ml of methylene chloride, and worked up, as described in Example 13. 2-O-Acetyl-1,6-anhydro-5-O-benzyl-3-O-n-propyl-β-D-glycofuranose is thus obtained as a yellowish oil of $R_f = 0.30$ (thin layer chromatography on silica gel) cyclohexane/ethyl acetate (2:1); IR 1,750 cm$^{-1}$ (carbonyl band).

EXAMPLE 16

A solution of 25 g of 2-O-acetyl-1,6-anhydro-5-O-benzyl-3-O-n-propyl-β-D-glycofuranose in 500 ml of methanol is treated with 0.8 g of potassium carbonate as described in Example 14 and worked up, and the product is purified. 1,6-Anhydro-5-O-benzyl-3-O-n-propyl-β-D-glycofuranose, thus obtained and degassed in a high vacuum, is obtained as a yellowish oil of $R_f = 0.45$ (thin layer chromatography on silica gel) in the system methylene chloride/methanol (15:1), and $[\alpha]_D^{20} = -4° \pm 1°$ (chloroform, c = 0.705).

EXAMPLE 17

A solution of 52.5 g of 1,2-di-O-acetyl-3-O-n-propyl-5,6-di-O-p-chlorobenzyl-D-glucofuranose in 250 ml of methylene chloride is treated with a solution of 6.8 g of tin tetrachloride in 50 ml of methylene chloride, as described in Example 13, and the mixture is worked up. 2-O-Acetyl-1,6-anhydro-5-O-p-chlorobenzyl-3-O-n-propyl-β-D-glycofuranose is thus obtained as a yellowish oil of $R_f$=0.30 (thin layer chromatography on silica gel), cyclohexane/ethyl acetate (2:1); IR 1,750 cm$^{-1}$ (carbonyl band).

EXAMPLE 18

A solution of 28 g of 2-O-acetyl-1,6-anhydro-5-O-p-chlorobenzyl-3-O-n-propyl-β-D-glucofuranose in 560 ml of methanol is treated with 0.9 g of potassium carbonate, as described in Example 14, and worked up. The residue is purified by column chromatography on silica gel, using elution with methylene chloride/ethyl acetate (85:15). 1,6-Anhydro-5-O-p-chlorobenzyl-3-O-n-propyl-β-D-glucofuranose, thus obtained and degassed in a high vacuum, is obtained as a clear yellowish oil of $R_f$ = 0.2 (thin layer chromatography on silica gel) in the system methylene chloride/ethyl acetate (85:15), and $[\alpha]_D^{20} = -10° \pm 1°$ (chloroform, c = 1.026).

EXAMPLE 19

A solution of 78.0 g of 1-O-acetyl-6-O-benzyl-2-O-methyl-3,5-di-O-n-propyl-D-glycofuranose in 400 ml of 1,2-dichloroethane is mixed, as described in Example 13, with a solution of 21.6 g of tin tetrachloride in 100 ml of 1,2-dichloroethane, and the mixture is worked up. The resulting oil is purified by column chromatography on silica gel, using elution with methylene chloride and then methylene chloride/ethyl acetate (85:15). 1,6-Anhydro-2-O-methyl-3,5-di-O-n-propyl-β-D-glycofuranose thus obtained, and degassed in a high vacuum, has an $R_f$ value = 0.45 (thin layer chromatography on silica gel) in the system methylene chloride/ethyl acetate (85:15) and an optical rotation $[\alpha]_D^{20} = +15° \pm 1°$ (chloroform, c = 1,121).

EXAMPLE 20

1.77 g of copper-II sulphate (anhydrous) is added to a solution of 17.7 g of ethyl-3,5-di-O-methyl-D-glucofuranoside in 1.8 litres of 1,2-dichloroethane, whilst stirring and excluding moisture, and dry hydrogen chloride is passed in for 2½ hours. After standing for a further 2 hours, the bulk of the hydrogen chloride is expelled by means of a stream of nitrogen and the solution is neutralised with 300 g of sodium bicarbonate added in portions. The salts are filtered off, the solvent is evaporated in a water pump vacuum and distillation in a bulb tube yields 1,6-anhydro-3,5-di-O-methyl-β-D-glycofuranose, boiling point 140°–150°C (external temperature) at 0.05 mm Hg; $R_f$ = 0.23 on silica gel thin layer plates in the system methylene chloride/methanol (15:1), and $[\alpha]_D^{20} = +14° \pm 1°$ (c = 1.169 in chloroform).

EXAMPLE 21

0.2 g of anhydrous copper-II sulphate is added to a solution of 2.0 g of ethyl-2-O-methyl-3,5-di-O-n-propyl-D-glucofuranoside in 200 ml of 1,2-dichloroethane whilst stirring and excluding moisture, and the mixture is saturated with hydrogen chloride for 2 hours. The reaction mixture is stirred for a further 3½ hours in a closed apparatus and is then poured onto ice water. The organic phase is washed with a saturated sodium bicarbonate solution and water, dried over magnesium sulphate, filtered and freed of the solvent. The crude product is dissolved in a little ether, the solution is filtered over neutral aluminum oxide, and elution is carried out with 100 ml of ether. After evaporation of the solvent, 1,6-anhydro-2-O-methyl-3,5-di-O-n-propyl-β-D-glycofuranose is obtained as a colourless oil, boiling point 90°–100°C (external temperature) at 0.04 mm Hg, optical rotation $[\alpha]_D^{20} = +15° \pm 1°$ (c = 1.121 in chloroform), $R_f$ = 0.43 on silica gel thin layer plates in the system methylene chloride/ethyl acetate (85:15).

EXAMPLE 22

0.4 g of 1-O-acetyl-6-O-mesyl-2-O-methyl-3,5-di-O-n-propyl-D-glycofuranose is dissolved in 1.0 ml of absolute methanol and a solution of 0.05 g of sodium in 1.0 ml of absolute methanol is added. This mixture is stirred for 24 hours at room temperature and then diluted with 100 ml of ether, and the ether solution is washed with water until neutral, dried over magnesium sulphate, filtered and evaporated to dryness. The oily residue is dissolved in 1.0 ml of ether, the solution is filtered over 2.0 g of neutral aluminum oxide, and elution is carried out with ether. 1,6-Anhydro-2-O-methyl-3,5-di-O-n-propyl-β-D-glycofuranose is obtained as a colourless oil, boiling point 90°–100°C (external temperature) at 0.04 mm Hg, optical rotation $[\alpha]_D^{20} = +15° \pm 1°$ (c = 1.121 in chloroform), $R_f$ = 0.43 on silica gel thin layer plates in the system methylene chloride/ethyl acetate (85:15).

EXAMPLE 23

500 ml of water and 150 ml of 1 N hydrochloric acid are added to the solution of 58.6 g of ethyl-5-O-mesyl-2-O-methyl-3-O-n-propyl-D-xylofuranoside in 750 ml of acetone and this mixture is kept at 50°C for 24 hours. After this reaction time, the ethylglycoside has been completely hydrolysed. 30.0 g of sodium bicarbonate are now carefully added to the warm solution of 5-O-mesyl-3-O-n-propyl-D-xylofuranose and the mixture is warmed for a further 24 hours at 50°C and is freed of the acetone in a water pump vacuum. The residue in the flask is extracted with ether and the ether phase is washed with water under neutral, dried over magnesium sulphate, filtered and evaporated to dryness. The 1,5-anhydro-2-O-methyl-3-O-n-propyl-β-D-xylofuranose thus obtained is distilled in a high vacuum, boiling point 45°C at 0.02 mm Hg, $R_f$ = 0.36 on silica gel thin layer plates in the system ether/petroleum ether (1:1), $[\alpha]_D^{20} = -19° \pm 1°$ (c = 1.198 in chloroform).

EXAMPLE 24

A solution of 79.6 g of ethyl-2-O-benzyl-5-O-mesyl-3-O-n-propyl-D-xylofuranoside in 1,400 ml of acetone is warmed, with 670 ml of distilled water and 210 ml of 1 N hydrochloride acid, to 60°C for 19 hours. The intermediate product obtained is 2-O-benzyl-5-O-mesyl-3-O-n-propyl-D-xylofuranose of $R_f$ = 0.57 on silica gel thin layer plates in the system methylene chloride/ethyl acetate (85:15), and this is reacted further without isolation.

40 g of sodium bicarbonate and 50 ml of a saturated sodium bicarbonate solution are carefully added to this hydrochloric acid solution. This mixture is kept at 60°C for 24 hours. The acetone is then evaporated off in a water pump vacuum and the residue is extracted with ether. The ether phase is washed with water until neutral, dried over magnesium sulphate, filtered and freed of the ether. The residue is chromatographed on 1,200 g of silica gel using ether:n-hexane (2:1), and the 1,5-anhydro-2-O-benzyl-3-O-n-propyl-β-D-xylofuranose thus obtained is distilled at 110°C and 0.01 mm Hg in a bulb tube; $[\alpha]_D^{20} = -7° \pm 1°$ (c = 1.290 in chloroform) and $R_f = 0.28$ on silica gel thin layer plates in the system ether/petroleum ether (1:1).

EXAMPLE 25

A solution of 18.1 g of 1,5-anhydro-2-O-benzyl-3-O-n-propyl-β-D-xylofuranose in 180 ml of ethanol is hydrogenated with 1.5 g of 5% strength palladium on charcoal as the catalyst for 12 hours at normal pressure and room temperature, 1.58 litres (103%) of hydrogen being taken up. The catalyst is filtered off and rinsed with ethanol and the filtrate is evaporated to dryness in a water pump vacuum. 1,5-Anhydro-3-O-n-propyl-β-D-xylofuranose thus obtained is distilled in a bulb tube in a high vacuum, boiling point 105°–130°C (bath temperature) at 0.2 mm Hg, optical rotation $[\alpha]_D^{20} = -17° \pm 1°$ (c = 1.225 in chloroform) and $R_f = 0.1$ on silica gel/thin layer plates in the system ether/petroleum ether (1:2).

EXAMPLE 26

15 g of 1,6-anhydro-3,5-di-O-benzyl-β-D-glucofuranose in 60 ml of pyridine and 14 g of acetylsalicyclic acid chloride in 40 ml of chloroform are allowed to react for 2 hours at 50°C. Ice water is added, the product is taken up in chloroform and the chloroform phase is successively extracted by shaking with 2 N hydrochloric acid, 5% strength sodium bicarbonate solution and water. After drying over sodium sulphate, b 1,6-anhydro-2-O-salicyloyl-3,5-di-O-benzyl-β-D-glycofuranose is obtained as an oil which is chromatographed on silica gel in cyclohexane/ethyl acetate, 7:3, $[\alpha]_D^{20} = +7.0°$ (chloroform, c = 1).

EXAMPLE 27

5 g of 1,6-anhydro-2-O-salicyloyl-3,5-di-O-benzyl-β-D-glucofuranose in 30 ml of pyridine are acetylated with 10 ml of acetic anhydride at 50°C. After 15 hours, methanol is added at about 25°C, the mixture is evaporated and the residue is taken up in chloroform. After extracting the chloroform phase by shaking with 1 N hydrochloric acid, sodium bicarbonate solution and water, 1,6-anhydro-2-O-acetylsalicyloyl-3,5-di-O-benzyl-β-D-glycofuranose is obtained as a syrup which crystallises from ether, melting point 87°–88°C, $[\alpha]_D^{20} = -5.2°$ (chloroform, c = 1.55).

EXAMPLE 28

1.23 g of sodium hydride dispersion are added to 8 g of 1,6-anhydro-3,5-di-O-benzyl-β-D-glucofuranose in 40 ml of absolute dimethylsulphoxide and, after the evolution of hydrogen has ceased, 4.5 g of 2-diethylamino-ethyl chloride in 25 ml of dimethylsulphoxide are added. After 2 hours the mixture is concentrated at 60°C, the residue is taken up in ether and the ether phase is washed with water and sodium chloride solution. After drying and concentration, 1,6-anhydro-2-O-(2-diethylaminoethyl)-3,5-di-O-benzyl-β-D-glucofuranose is obtained as an oil which is chromatographed on silica gel in chloroform/acetone (8:2), $[\alpha]_D^{20} = +2.6°$ (chloroform, c = 3.2).

With hydrogen chloride/ethanol, the hydrochloride is obtained, melting point 113°–114°C, $[\alpha]_D^{20} = 0°$ (chloroform, c = 1.05).

EXAMPLE 29

5 g of 1,6-anhydro-2-O-benzoyl-3,5-di-O-benzyl-β-D-glucofuranose is hydrogenated, in methanol, with 5% strength palladium on charcoal at about 25°C. After 1 hour, 1 mol equivalent of hydrogen has been taken up and the hydrogenation is stopped. 1,6-Anhydro-2-O-benzoyl-3-O-benzyl-β-D-glucofuranose is obtained as crystals of melting point 121°–122°C.

EXAMPLE 30

A solution of 26.0 g of 2,5-di-O-acetyl-salicyloyl-3-O-benzyl-1,6-anhydro-β-D-glucofuranose in 860 ml of a 1 N solution of hydrogen chloride in absolute ethanol is left to stand for 20 hours at room temperature and the solvent and hydrogen chloride are then removed under reduced pressure. The residue is taken up in ether, the resulting solution is washed with saturated sodium bicarbonate solution and water, dried over sodium sulphate and filtered, and the filtrate is freed of the solvent. 2,5-Di-O-salicyloyl-3-O-benzyl-1,6-anhydro-β-D-glucofuranose, purified by column chromatography on 1,200 g of silica gel using ether/petroleum ether (1:1) as the migrating agent, is obtained as white crystals of melting point 102°–103.5°C and of optical rotation $[\alpha]_D^{20} = -3° \pm 1°$, (chloroform, c = 0.818).

EXAMPLE 31

21.5 g of 2-O-acetyl-1,6-anhydro-3,5-di-O-benzyl-β-D-allofuranose in a solution of 0.8 g of potassium carbonate in 500 ml of methanol are stirred for 15 hours at about 20°C. The reaction mixture is evaporated, the residue is taken up in ether and the ether solution is washed with water. After drying, filtration and evaporation of the ether phase, a syrup is obtained, which is purified by column chromatography on silica gel, eluting with methylene chloride/ethyl acetate (3:1). The 1,6-anhydro-3,5-di-O-benzyl-β-D-allofuranose thus obtained is in the form of white crystals of melting point 60°–62°C, $R_f = 0.42$ (thin layer chromatography on silica gel) in the system methylene chloride/ethyl acetate (3:1) and $[\alpha]_D^{20} = +17° \pm 1°$ (chloroform, c = 0.979).

EXAMPLE 32

Analogously to the description in Example 10, 1,6-anhydro-3,5-di-O-benzyl-β-D-allofuranose and benzoyl chloride yield 1,6-anhydro-2-O-benzoyl-3,5-di-O-benzyl-β-D-allofuranose.

EXAMPLE 33

Analogously to the description in Example 9, 1,6-anhydro-3,5-di-O-benzyl-β-D-allofuranose and phenylisocyanate yield 1,6-anhydro-3,5-di-O-benzyl-2-O-(N-phenylcarbamoyl)-β-D-allofuranose.

EXAMPLE 34

3 ml of benzoyl chloride are added to 3 g of 1,6-anhydro-3-O-benzyl-β-D-glucofuranose in 20 ml of pyridine and the mixture is allowed to react for two days at 50°C. A little water is then added, the bulk of the pyridine is evaporated off in vacuo and the residue is stirred with ice. 1,6-Anhydro-2,5-di-O-benzoyl-3-O-benzyl-β-D-glucofuranose is obtained in the form of crystals which are recrystallised from methanol, melting point 136°–137°C, $[\alpha]_D^{20} = -9.1°$ (chloroform, c = 1.04).

EXAMPLE 35

Analogously to Example 1, α,β-1-O-acetyl-2,3,5-tri-O-benzoyl-6-O-benzyl-D-allofuranose and tin tetrachloride yield 1,6-anhydro-2,3,5-tri-O-benzoyl-β-D-allofuranose.

EXAMPLE 36

Analogously to Example 1, α,β-1-O-acetyl-2,3,5-tri-O-benzoyl-6-O-benzyl-D glucofuranose and tin tetrachloride yield 1,6-anhydro-2,3,5-tri-O-benzoyl-β-D-glucofuranose.

EXAMPLE 37

Analogously to Example 10, 1,6-anhydro-3,5-di-O-benzyl-β-D-allofuranose and α-naphthoyl chloride yield 1,6-anhydro-3,5-di-O-benzyl-2-O-(α-naphthoyl)-β-D-allofuranose.

EXAMPLE 38

Analogously to Example 10, 1,6-anhydro-3,5-di-O-benzyl-β-D-glucofuranose and α-naphthoyl chloride yield 1,6-anhydro-3,5-di-O-benzyl-2-O-(α-naphthoyl)-β-D-glucofuranose.

EXAMPLE 39

Analogously to Example 10, 1,6-anhydro-3,5-di-O-benzyl-β-D-glucofuranose and β-naphthoyl chloride yield 1,6-anhydro-3,5-di-O-benzyl-2-O-(β-naphthoyl)-β-D-glucofuranose.

EXAMPLE 40

A solution of 21.8 g of acetylsalicylic acid chloride in 100 ml of methylene chloride is added dropwise over the course of 15 hours to a solution of 12.6 g of 3-O-benzyl-1,6-anhydro-β-D-glucofuranose in 100 ml of methylene chloride and 15 ml of pyridine, whilst stirring at 40°C. After adding 20 ml of water, the methylene chloride and pyridine are distilled off under reduced pressure. The residue is taken up in diethyl ether and the ether solution is washed with icecold 2 N hydrochloric acid, saturated sodium bicarbonate solution and water. The residue obtained after drying, filtration and evaporation is purified by column chromatography on 1,200 g of silica gel, using ether/petroleum ether (1:1). 2,5-Di-O-acetyl-salicyloyl-3-O-benzyl-1,6-anhydro-β-D-glucofuranose is thus obtained and can be deacetylated as described in Example 30.

EXAMPLE 41

Analogously to Example 13, 1,2-di-O-acetyl-3,5,6-tri-O-benzyl-D-allofuranose and tin tetrachloride yield 2-O-acetyl-1,6-anhydro-3,5-di-O-benzyl-β-D-allofuranose, which can be deacetylated as described in Example 31.

EXAMPLE 42

Capsules containing 0.1 g of the active substance can be manufactured as follows (for 10,000 capsules):

Composition:

| | |
|---|---|
| 1,6-Anhydro-3,5-di-O-benzyl-β-D-glucofuranose | 1,000 g |
| Absolute ethanol | 100 g |

The 1,6-anhydro-3,5-di-O-benzyl-β-D-glucofuranose is mixed with the ethanol and the mixture is filled into soft gelatine capsules with the aid of a suitable capsule-making machine.

We claim:

1. Anhydrofuranose derivatives of the formula I

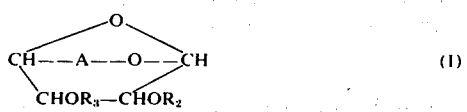

wherein $R_2$ is hydrogen, lower alkyl, lower aminoalkyl, mono- or di-lower alkylamino-lower alkyl, lower alkenyl, (phenyl or naphthyl)lower alkyl, lower alkanoyl, benzoyl, naphthoyl, pyridylcarbonyl, lower alkanesulphonyl, benzenesulphonyl, carbamoyl, lower alkylcarbamoyl or phenyl-carbamoyl, wherein benzene or naphthalenemoieties are unsubstituted in the aromatic nuclei or substituted therein by up to three members of the group consisting of chloro, bromo, lower alkyl, lower alkoxy, trifluoromethyl, hydroxy or lower alkanoyloxy, or at least one of the radicals $R_2$ and $R_3$ is the radical of the formula III

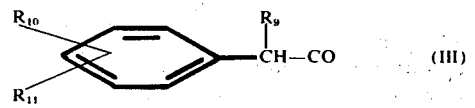

wherein $R_9$ denotes hydrogen, 3- to 8-membered cycloalkyl or lower alkyl, $R_{10}$ denotes hydrogen, chloro, bromo or trifluoromethyl, $R_{11}$ denotes said phenyl radical defined for $R_2$, 5- to 8-membered 1-cycloalkenyl, lower alkoxy, lower alkenyloxy, lower alkyl, mono-or di-lower alkylamino, lower alkyleneamino, lower alkenyleneamino, phenylamino or N-phenyl-N-lower alkylamino, pyrrolyl(1), 3,6-dihydro-2-H-1,2-oxazinyl-(2) or 1-oxo-isoindolinyl-(2), and the others of the radicals $R_2$ and $R_3$ independently of one another are hydrogen, lower alkyl, lower alkenyl, benzyl, lower alkylbenzyl, lower alkoybenzyl, (chloro or bromo)-benzyl, trifluoromethyl-benzyl or hydroxy-benzyl, or $R_2$ and $R_3$ are lower alkylidene or benzylidene, $R_3$ is hydrogen, lower alkyl, lower alkenyl, or said (phenyl or naphthyl)-lower alkyl, lower alkanoyl, benzoyl or naphthoyl moieties defined for $R_2$ and —A—O— is —CHOR$_5$—CH$_2$—O—, wherein $R_5$ has one of the meanings indicated for $R_3$, or wherein two of the radicals $R_2$, $R_3$ and $R_5$ together represent lower alkylidene or phenyl-lower alkylidene wherein phenyl is defined as for $R_2$ and the third of the radicals $R_2$, $R_3$ and $R_5$ is different from hydrogen if the other two of these radicals are hydrogen, and one of the radicals $R_2$, $R_3$ and $R_5$ is different from methyl if the other two of these radicals are methyl, and one of the radicals $R_2$, $R_3$ and $R_5$ is different from acetyl if the other two of the radicals are acetyl, and one of the radicals $R_2$, $R_3$ and $R_5$ is different from p-toluenesulphonyl if the others of these radicals are p-toluenesulphonyl, or pharmaceutically usable non-toxic acid addition salts thereof.

2. A compound as claimed in claim 1, in which formula —A—O— is —CHOR$_5$—CH$_2$—O— and one of the radicals R$_2$, R$_3$ and R$_5$ is the radical of the formula III, wherein R$_9$ is lower alkyl, R$_{10}$ is hydrogen or chlorine, R$_{11}$ is phenyl, cyclopentyl, cyclohexyl, 1-cyclopentenyl, 1-cyclohexenyl, 1-cycloheptenyl, 1-cyclooctenyl, ixopropyl, 1-methyl-n-propyl-1 or also Δ$^3$-pyrrolinyl and the other two of the radicals R$_2$, R$_3$ and R$_5$ independently of one another are hydrogen, lower alkyl with 1–3 C atoms, allyl, methallyl, benzyl, methylbenzyl, methoxybenzyl, chlorobenzyl or trifluoromethylbenzyl.

3. A compound as claimed in claim 1, in which formula —A—O is —CHOR$_5$—CH$_2$—O— and R$_2$ is the radical of the formula III, wherein R$_9$ is methyl, R$_{10}$ is hydrogen, R$_{11}$ is phenyl, cyclohexyl, 1-cyclohexenyl, 1-cycloheptenyl, 1-cyclooctenyl, or Δ$^3$-pyrrolinyl and R$_3$ and R$_5$ independently of one another are hydrogen, lower alkyl with 1–3 C atoms, allyl, methallyl, benzyl or chlorobenzyl.

4. A compound as claimed in claim 1, in which formula —A—O— is —CHOR$_5$—CH$_2$—O—, R$_2$ is the radical of the formula III, wherein R$_9$ is methyl, R$_{10}$ is hydrogen, R$_{11}$ is phenyl, cyclohexyl, 1-cyclohexenyl, 1-cycloheptenyl, 1-cyclooctenyl or Δ$^3$-pyrrolinyl and R$_3$ and R$_5$ are hydrogen.

5. A compound as claimed in claim 1 being 1,6-Anhydro-3,5-di-O-benzyl1- 2-O-α-[4-(cyclohexen-1-yl)-phenyl]-propionyl-β-D-glucofuranose.

6. A compound as claimed in claim 1, in which formula —A—O— is —CHOR$_5$—CH$_2$—O— and R$_2$, R$_3$ and R$_5$ independently of one another are alkyl with 2–7 C atoms, lower alkenyl, aryl- lower alkyl wherein "aryl" is phenyl or phenyl substituted by one member of chloro, bromo, lower alkyl, lower alkoxy, trifluoromethyl, hydroxy or lower alkanoyloxy, alkanoyl with 3–7 C atoms, or aroyl selected from benzoyl, (chloro or bromo)-benzoyl, lower alkyl- benzoyl, lower alkoxybenzoyl, trifluoromethylbenzoyl, hydroxybenzoyl, lower alkanoyloxybenzoyl, α-naphthoyl, β-naphthoyl, or pyridylcarbonyl, or two of the radicals R$_2$, R$_3$ and R$_5$ are hydrogen and the third of the radicals R$_2$, R$_3$ and R$_5$ is lower alkyl, lower alkenyl, said aryl-lower alkyl, lower alkanoyl or said aroyl, or two of the radicals R$_2$, R$_3$ and R$_5$ are lower alkylidene or said aryl-lower alkylidene and the third of the radicals R$_2$, R$_3$ and R$_5$ is hydrogen, lower alkyl, lower alkenyl, said aryl-lower alkyl, lower alkanoyl or said aroyl, with one of the radicals R$_2$, R$_3$ and R$_5$ being different from hydrogen if the other two of these radicals are hydrogen, with one of the radicals R$_2$, R$_3$ and R$_5$ being different from methyl if the other two of these radicals are methyl, and with one of the radicals R$_2$, R$_3$ and R$_5$ being different from acetyl if the other two of these radicals are acetyl.

7. A compound as claimed in claim 1, in which formula —A—O— is —CHOR$_5$—CH$_2$—O—, R$_2$ is hydrogen, alkyl with 1–3 C atoms, di-alkylamino-alkyl with a total of up to 4 C atoms, benzyl, chlorobenzyl, alkanoyl with 2–4 C atoms, benzoyl, o-hydroxybenzoyl, o-alkanoyloxybenzoyl with 2–4 C atoms in the alkanoyloxy part, naphthoyl, alkylcarbamoyl with up to 4 C atoms, phenylcarbamoyl, alkylsulphonyl with 1–3 C atoms, phenylsulphonyl, toluenesulphonyl or pyridylcarbonyl and R$_2$ and R$_5$ independently of one another are hydrogen, alkyl with 1–3 C atoms, benzyl, chlorobenzyl or benzoyl, with one of the radicals R$_2$, R$_3$ and R$_5$ being different from hydrogen if the other two of these radicals are hydrogen, and with one of the radicals R$_2$, R$_3$ and R$_5$ being different from methyl if the other two of these radicals are methyl and with one of the radicals R$_2$, R$_3$ and R$_5$ being different from acetyl if the other two of these radicals are acetyl.

8. A compound as claimed in claim 1, in which formula —A—O is —CHOR$_5$—CH$_2$—O—, R$_2$ is alkanoyl with 2–4 C atoms, benzoyl, o-hydroxybenzoyl, o- alkanoyloxybenzoyl with 2–4 C atoms in the alkanoyloxy part, naphthoyl or pyridylcarbonyl, and R$_3$ and R$_5$ independently of one another are hydrogen, alkyl with 2 or 3 C atoms, benzyl, chlorobenzyl, benzoyl or o-hydroxybenzoyl.

9. A compound as claimed in claim 1, in which formula —A—O— is —CHOR$_5$—CH$_2$—O—, R$_2$ is hydrogen and R$_3$ and R$_5$ independently of one another are alkyl with 1–3 C atoms, allyl, methallyl, benzyl or chlorobenzyl.

10. A compound as claimed in claim 1, in which formula —A—O— is —CHOR$_5$—CH$_2$—O—, R$_2$ is hydrogen, alkanoyl with 2–4 C atoms, benzoyl, o-hydroxybenzoyl, o-acetoxybenzoyl, o-acetoxybenzoyl, naphthoyl or pyridylcarbonyl and R$_3$ and R$_5$ independently of one another are alkyl with 1–3 C atoms, benzyl, chlorobenzyl, benzoyl, o-hydroxybenzyl, o-acetoxybenzoyl or naphthoyl.

11. A compound as claimed in claim 1, being 1,6-Anhydro-3,5-di-O-benzyl-β-D-allofuranose.

12. A compound as claimed in claim 1, being 1,6-Anhydro-2-O-benzoyl-3,5-di-O-benzyl-β-D-allofuranose.

13. A compound as claimed in claim 1, being 1,6-Anhydro-2-O-benzoyl-3,5-di-O-benzyl-β-D-glucofuranose.

14. A compound as claimed in claim 1, being 1,6-Anhydro- 3,5-di-O-benzyl-β-D-glucofuranose.

* * * * *